(12) United States Patent
El-Baz et al.

(10) Patent No.: US 9,230,321 B2
(45) Date of Patent: *Jan. 5, 2016

(54) COMPUTER AIDED DIAGNOSTIC SYSTEM INCORPORATING 3D SHAPE ANALYSIS OF THE BRAIN FOR IDENTIFYING DEVELOPMENTAL BRAIN DISORDERS

(71) Applicant: University of Louisville Research Foundation, Inc., Louisville, KY (US)

(72) Inventors: Ayman S. El-Baz, Louisville, KY (US); Matthew Nitzken, Louisville, KY (US); Manuel F. Casanova, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/834,231

(22) Filed: Mar. 15, 2013

(65) Prior Publication Data

US 2013/0259346 A1    Oct. 3, 2013

Related U.S. Application Data

(60) Provisional application No. 61/617,869, filed on Mar. 30, 2012.

(51) Int. Cl.
*G06T 7/00*    (2006.01)

(52) U.S. Cl.
CPC ..... *G06T 7/0012* (2013.01); *G06T 2207/20081* (2013.01); *G06T 2207/30016* (2013.01)

(58) Field of Classification Search
None
See application file for complete search history.

(56) References Cited

U.S. PATENT DOCUMENTS

| | | | |
|---|---|---|---|
| 6,400,978 B1 * | 6/2002 | Teicher et al. | 600/410 |
| 6,463,315 B1 * | 10/2002 | Klingberg et al. | 600/410 |
| 6,549,646 B1 * | 4/2003 | Yeh et al. | 382/132 |
| 6,591,004 B1 * | 7/2003 | VanEssen et al. | 382/154 |
| 7,747,551 B2 * | 6/2010 | Snyder | 706/20 |
| 7,899,225 B2 * | 3/2011 | Collins et al. | 382/128 |
| 7,949,167 B2 * | 5/2011 | Krishnan et al. | 382/128 |
| 8,090,164 B2 * | 1/2012 | Bullitt et al. | 382/128 |
| 8,194,964 B2 * | 6/2012 | Wiley | 382/131 |
| 2004/0005304 A1 * | 1/2004 | Brudnak | 424/93.45 |
| 2004/0013291 A1 * | 1/2004 | Hillman | 382/128 |
| 2006/0241382 A1 * | 10/2006 | Li et al. | 600/410 |
| 2008/0292194 A1 * | 11/2008 | Schmidt et al. | 382/217 |
| 2009/0035766 A1 * | 2/2009 | Khan et al. | 435/6 |
| 2010/0042011 A1 * | 2/2010 | Doidge et al. | 600/544 |
| 2011/0044524 A1 * | 2/2011 | Wang et al. | 382/131 |
| 2011/0160546 A1 * | 6/2011 | Madsen | 600/300 |
| 2013/0116540 A1 * | 5/2013 | Li et al. | 600/410 |

* cited by examiner

*Primary Examiner* — Tsung-Yin Tsai

(74) *Attorney, Agent, or Firm* — Wood, Herron & Evans, LLP

(57) ABSTRACT

A computer aided diagnostic system and automated method classify a brain through modeling and analyzing the shape of a brain cortex, e.g., to detect a brain cortex that is indicative of a developmental disorder such as ADHD, autism or dyslexia. A model used in such analysis describes the shape of brain cortices in terms of spherical harmonics required to delineate a unit sphere corresponding to the brain cortex to a model of the brain cortex.

20 Claims, 11 Drawing Sheets

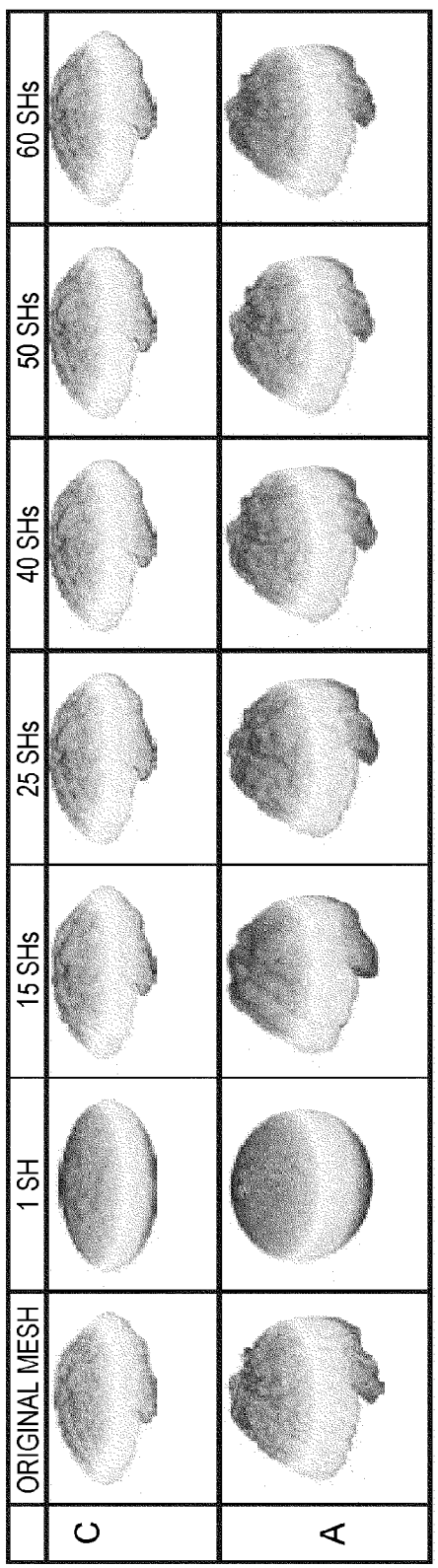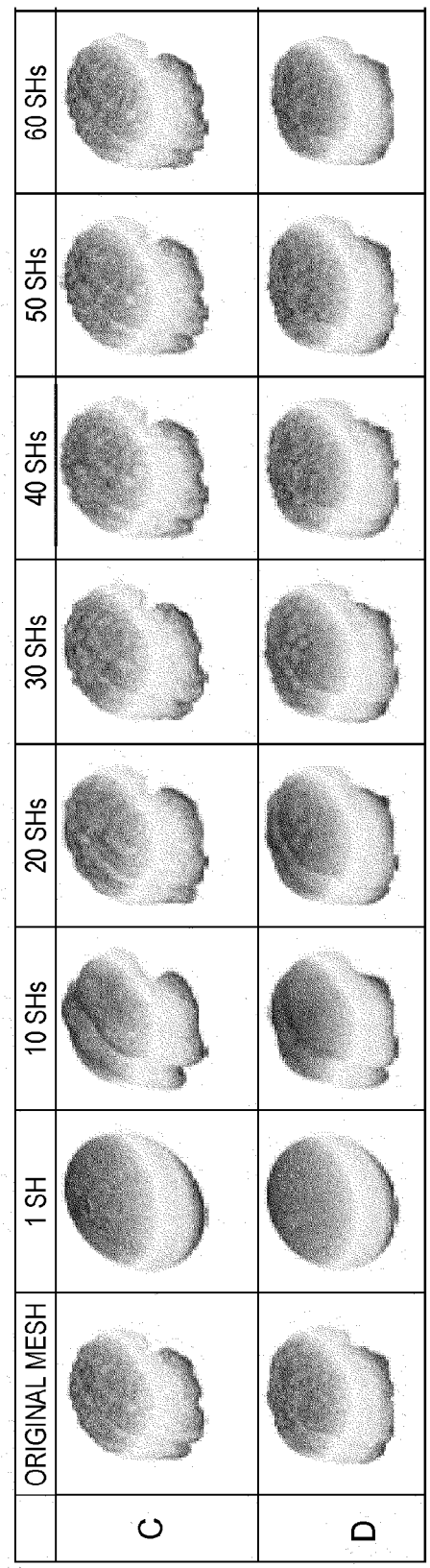
FIG. 2Q
FIG. 2R

COMPUTER AIDED DIAGNOSTIC SYSTEM INCORPORATING 3D SHAPE ANALYSIS OF THE BRAIN FOR IDENTIFYING DEVELOPMENTAL BRAIN DISORDERS

CROSS-REFERENCE TO RELATED APPLICATIONS

This application is a continuation of U.S. Provisional Application No. 61/617,869, filed on Mar. 30, 2012 by Ayman S. El-Baz et al., the entire disclosure of which is incorporated by reference herein.

FIELD OF THE INVENTION

The invention is generally related to computer analysis of medical image data, and in particular to the analysis medical images of the brain cortex to identify developmental brain disorders.

BACKGROUND OF THE INVENTION

Developmental brain disorders are among the most interesting and challenging research areas in modern neuroscience. Dyslexia is an extremely complicated example of such disorders that severely impairs the learning abilities of children. It is characterized by substandard reading skills which remain unaccounted for after considering an individual's age, overall intelligence, and education. Similarly, autism is another example of a brain disorder that is characterized by qualitative abnormalities in behavior and higher cognitive functions. It typically appears during the first three years of life and can severely impact the development of social interaction and communication skills.

Conventionally, identifying individuals having such brain disorders required observation by a trained professional to identify one or more characteristics typical of the disorder. For example, with respect to autism conventional autism diagnostics rely on recording patient reactions to varied stimuli through periodic screening interviews. Early observations by parents can greatly reduce the false positive rate and circumvent unnecessary referrals. However, the diagnosis is subject to human observational and perceptional errors because autism has many forms and personality traits that may be difficult to detect. A more objective computer aided diagnosis (CAD) is a prime necessity in this field.

Advances in neuro-imaging provide some possibilities for non-invasive methods for automatic dyslexia and/or autism detection by revealing differences between quantitative characteristics of normal, autistic and dyslexic brains. Studies have shown a relation between the cerebral white matter (CWM) volume and anatomy in dyslexic and autistic brains as compared to normal brains (see, e.g., M. Casanova et al., "Reduced brain size and gyrification in the brains of dyslexic patients," Journal of Child Neurology, 2004, vol. 9, issue 4, pp. 275-281 M. Klingberg et al., "Microstructure of Temporo-Parietal White Matter as a Basis for Reading Ability: Evidence from Diffusion Tensor Magnetic Resonance Imaging," Neuron, 2000, vol. 25, pp. 493-500; S. Niogi and B. McCandliss, "Left lateralized white matter microstructure accounts for individual differences in reading ability and disability," Neuropsychologia, 2006, vol. 44, pp. 2178-2188; E. Aylward et al., "Effects of age on brain volume and head circumference in autism," Neurology, 2002, vol. 59, issue 2, pp. 175-183; and E. Courchesne et al., "Evidence of brain overgrowth in the first year of life in autism," Journal of American Medical Association, 2003, vol. 290, pp. 337-344).

Particularly, the CWM structural differences may generally be related to the volume of the CWM, where an autistic brain is reported as having a larger volume than a normal brain and a dyslexic brain is reported as having a smaller volume than a normal brain. Some conventional computer aided diagnoses systems utilize a volumetric analysis to classify a brain as autistic or dyslexic. However, a volumetric approach fails to account for other factors including, for example, age and gender. Thus, while volume has been linked to autism and dyslexia, computer aided analysis utilizing volume as a discriminating factor is not particularly accurate because of brain volume differences due to age and gender.

Therefore, a need continues to exist in the art for an improved image processing techniques for use in analyzing medical images of the brain.

SUMMARY OF THE INVENTION

The invention addresses these and other problems associated with the prior art by providing a computer aided diagnostic system and automated method for classifying a brain to identify potential developmental disorders using shape analysis. Particularly, some embodiments of the invention analyze the shapes of structures of a brain and classify subject brains based on the thickness of CWM gyrification, where gyrification describes the folds in the CWM. Embodiments of the invention analyze and quantify differences between the shapes of autistic and dyslexic (among other developmental disorders) and normal brains as opposed to conventional systems.

Consistent with one aspect of the invention, therefore, a method of classifying a brain includes receiving image data associated a scan of a brain; segmenting the image data associated with a brain cortex of the brain from the image data; equalizing the segmented image data; modeling the segmented image data to generate a 3D mesh model of the brain; mapping the 3D mesh model to a unit sphere; computing the spherical harmonics for delineating the unit sphere to the 3D mesh model; and classifying the brain based at least in part on the computed SHs used to delineate the unit sphere and a learned shape model based on the classification of a plurality of previously classified brains.

Consistent with another aspect of the invention, a brain may be classified by processing image data including a brain cortex to generate segmented image data for the brain cortex; generating a three dimensional (3D) model of the brain cortex based on the segmented image data; performing shape analysis of the 3D model; and classifying the brain cortex based on the shape analysis of the 3D model.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 2A, 2E and 2I are exemplary head scan images, while FIGS. 2B-2D, 2E-2H and 2J-2R illustrate various operations performed on such images by the process of FIG. 1 and various results generated by the process of FIG. 1.

DETAILED DESCRIPTION

Embodiments consistent with the invention provide for automated classification of a developmental brain disorder principally through characterizing a brain through modeling and analyzing its shape, and typically without requiring image registration. The shape is described in terms of a unit sphere corresponding to a 3D mesh model of a brain delineated using a computed number of spherical harmonics (SHs) linearly combined as basis functions. Further details regarding the techniques described herein are provided in M. Nitzken, M. F. Casanova, G. Gimel'farb, F. Khalifa, A. Elnakib, A. E. Switala, and A. El-Baz, "3D Shape Analysis of the Brain Cortex with Application to Autism," IEEE International Symposium on Biomedical Imaging: From Nano to Macro, Chicago, Ill., Mar. 30-Apr. 2, 2011, pp. 1847-1850, M. Nitzken, M. F. Casanova, G. Gimel'farb, F. Khalifa, A. Elnakib, A. E. Switala, and A. El-Baz, "3D Shape Analysis of the Brain Cortex with Application to Dyslexia," 18th IEEE International Conference on Image Processing, Brussels, DE, Sep. 11-14, 2011, pp. 2657-2660, and A. El-Baz, M. Nitzken, A. Elnakib, F. Khalifa, G. Gimel'farb, R. Falk, M. El-Ghar, "3D Shape Analysis for Early Diagnosis of Malignant Lung Nodules," Proc. Of the 14th International Conference on Medical Image Computing and Computer-Assisted Intervention, vol. III, Toronto, Calif., Sep. 18-22, 2011, pp. 175-182, each of which is incorporated by reference in its entirety.

Figure 1:
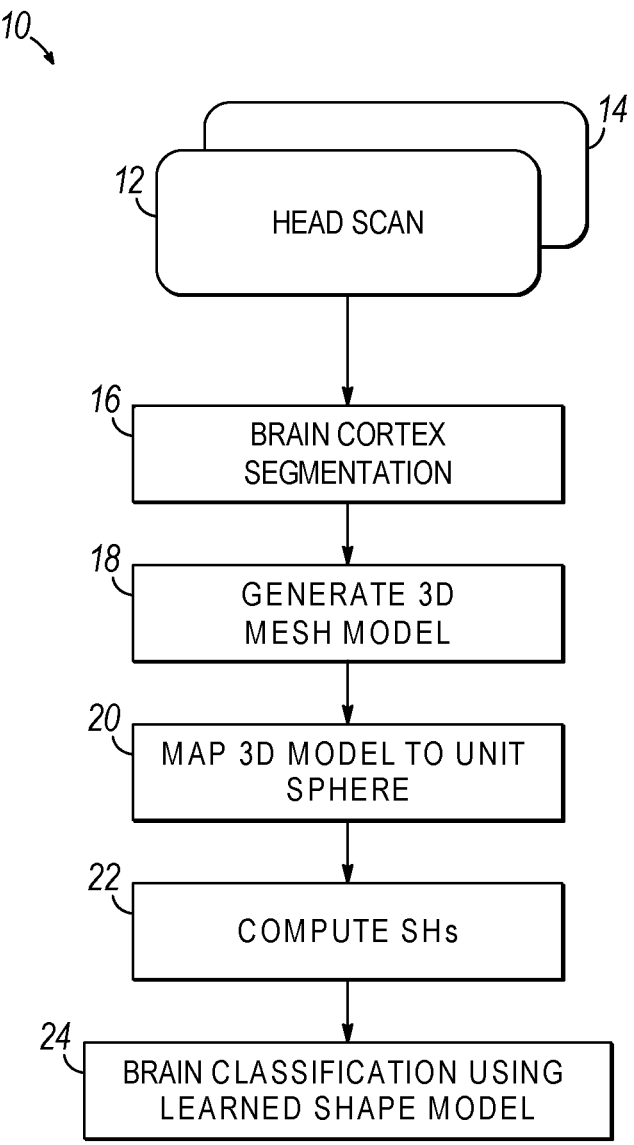
FIG. 1 is a flowchart of an automated brain classification process consistent with the invention.

Now turning to the Drawings, wherein like numbers denote like parts throughout the several views, FIG. 1 illustrates an exemplary automated process 10 for a 3D mesh model shape-based classification of a brain consistent with the invention. Process 10 in particular is based upon the determination of whether a brain is associated with a developmental disorder or normal via the analysis of a 3D mesh model of the brain cortex and application of a learned model based on a plurality of classified brain cortices. Process 10 receives as input one or more head scans 12, 14, and begins by segmenting the image data corresponding to the brain cortex of the brain from the head scans (block 16). A head scan, within the context of the invention, typically includes one or more two dimensional "slices" of image data generated from a medical imaging device such as a CT scanner, a magnetic resonance imaging (MRI) scanner, or other medical imaging device.

Figure 2A:
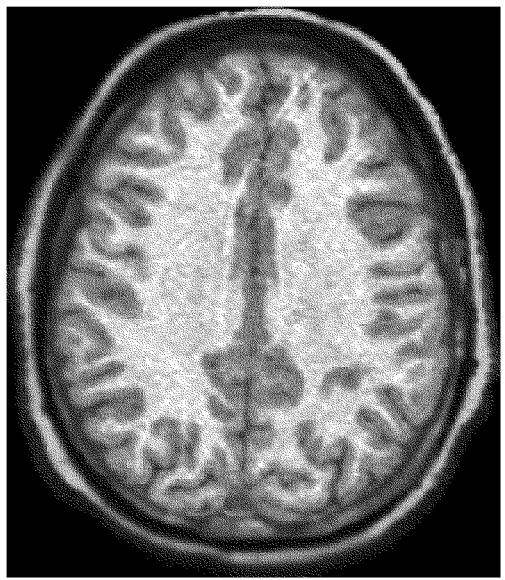
Figure 2B:
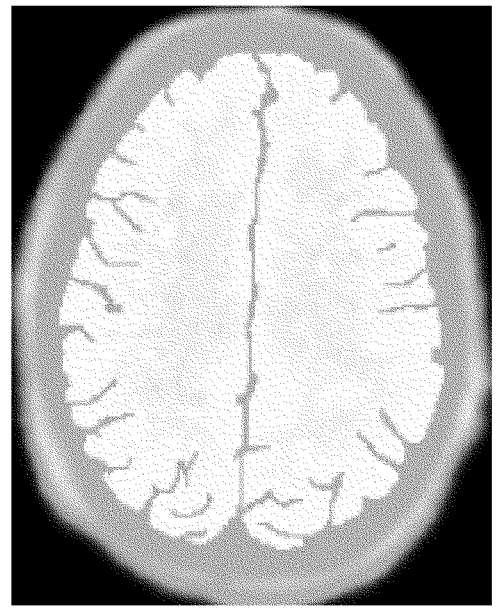
Figure 2C:
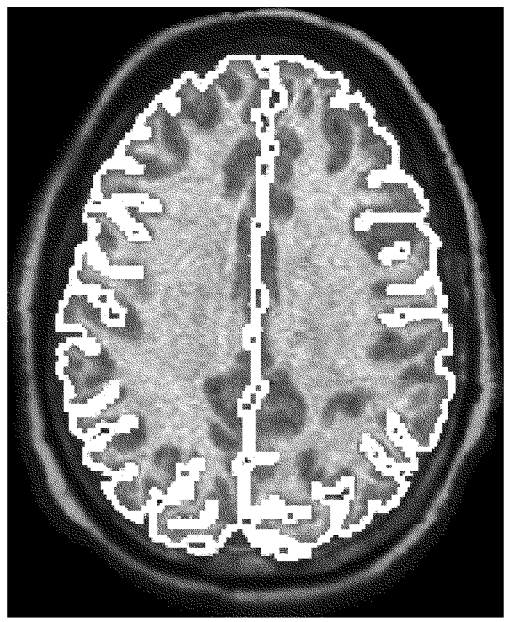
Figure 2D:
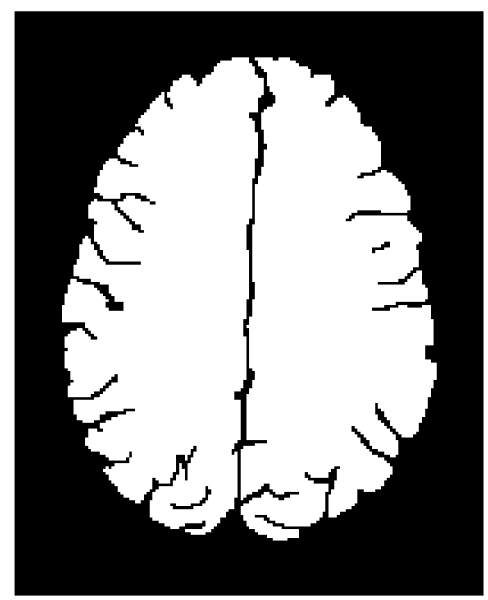
Figure 2E:
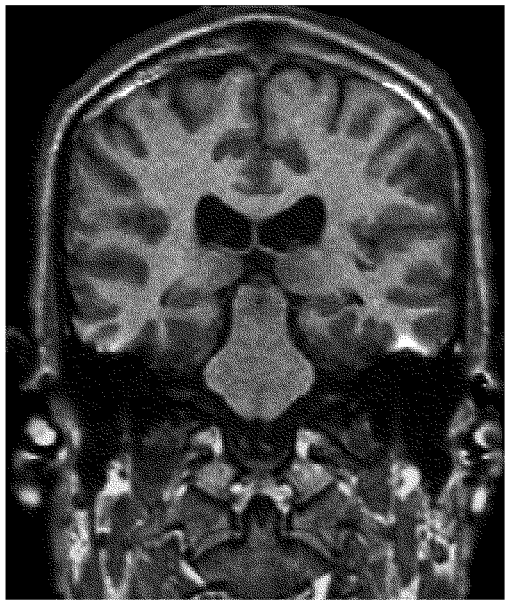
Figure 2F:
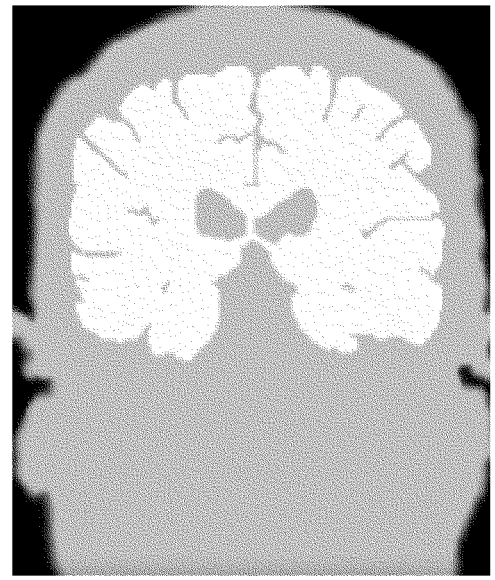
Figure 2G:
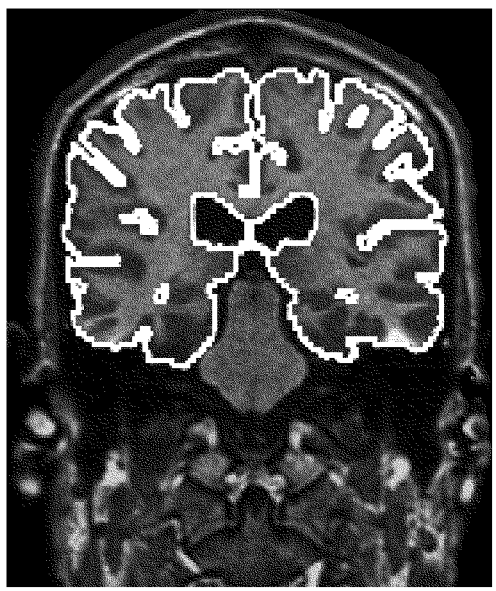
Figure 2H:
Figure 2I:
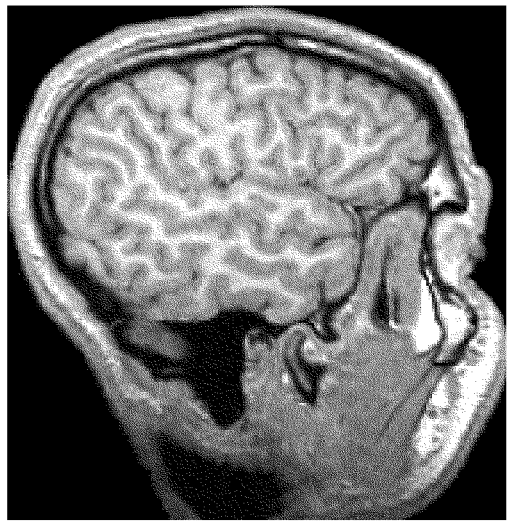
Figure 2J:
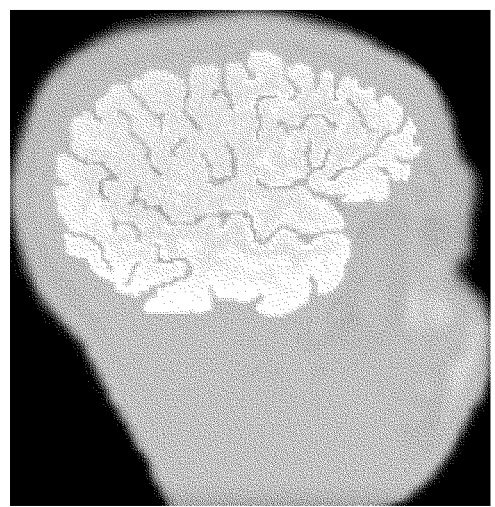
Figure 2K:
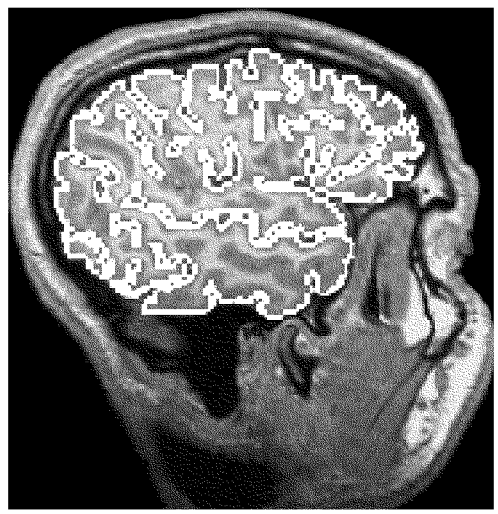
Figure 2L:
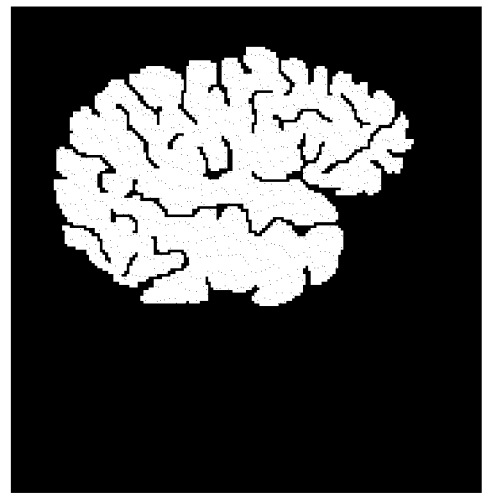

In particular, referring also to FIGS. 2A-2L, head scan image data equalization and brain cortex image data segmentation may be performed as disclosed in A. El-Baz, M. Casanova, et a., "Dyslexia diagnostics by 3D texture analysis of cerebral white matter gyrifications," ICPR, Tampa, Fla., USA, Dec. 8-11, 2008, pp. 1-4. FIGS. 2A, 2E and 2I are exemplary 2D brain scans in the axial, coronal, and sagittal planes respectively. FIGS. 2A, 2E and 2I may be equalized to generate a pixel-wise Gibbs energy images, such as the pixel-wise Gibbs energy images shown in FIGS. 2B, 2F and 2J. FIGS. 2C, 2G and 2K provide exemplary brain cortex segmentation images that may be generated from FIGS. 2B, 2F and 2J. FIGS. 2D, 2H and 2L are exemplary brain cortex segmentations that may be performed by a radiologist.

Figure 2M:
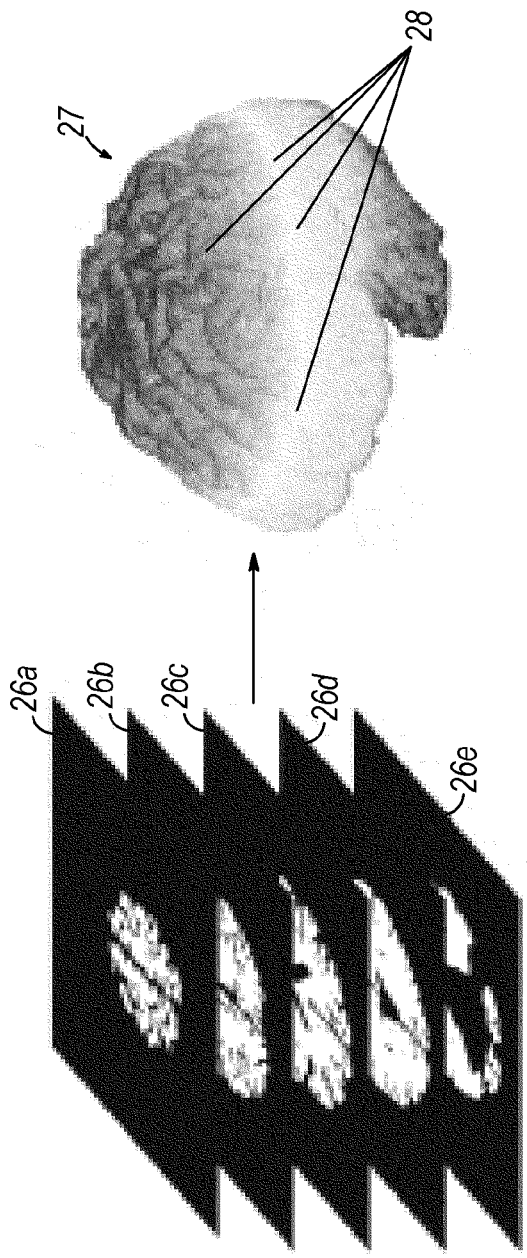
Figure 2P:
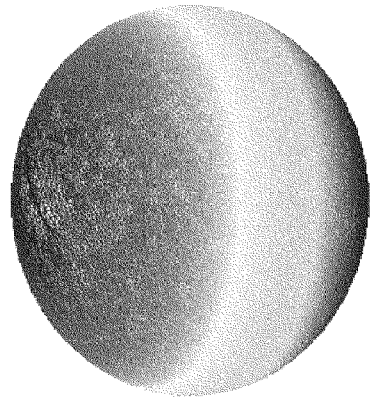
Figure 2O:
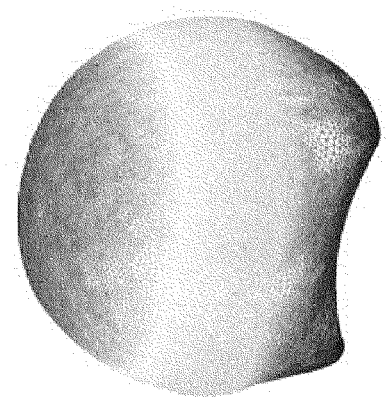
Figure 2N:
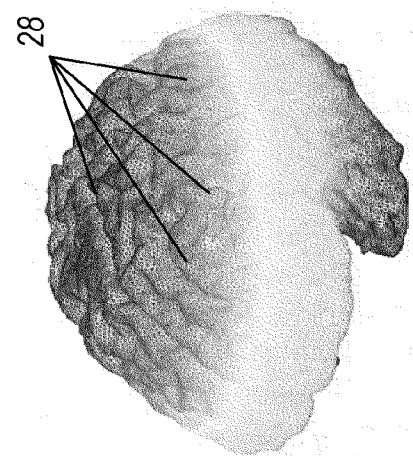

Following segmentation of the brain cortex image data from the head scans, a three dimensional (3D) mesh model including a plurality of mesh nodes is generated in block 18. Referring to FIG. 2M, this figure illustrates a successive stack of segmented brain cortex image data 26a-e which may be utilized to generate a 3D mesh model 27 including a plurality of mesh nodes 28. The 3D mesh model may be mapped to a corresponding unit sphere following mapping rules described below (block 20). Referring to FIGS. 2N-P, FIG. 2N provides an exemplary illustration of a 3D mesh model of a brain cortex; FIG. 2O provides an exemplary illustration of the 3D mesh model of FIG. 2N smoothed by Laplacian filtering; and FIG. 2P provides an exemplary illustration of a unit sphere corresponding to the 3D mesh model of FIG. 2N generated by applying an attraction and repulsion method to the mesh points of the smoothed mesh model of FIG. 2O.

After mapping the 3D mesh model to the unit sphere, the number of spherical harmonics needed to delineate the unit sphere to the original 3D mesh model of the brain cortex are computed (block 22). FIG. 2Q provides an exemplary illustration of a 3D mesh model for a brain cortex of a control brain (i.e., a normal brain) and an autistic brain and illustrates the delineation of a unit sphere corresponding to the 3D mesh model using spherical harmonics, as will be described in detail below. Similarly, FIG. 2R provides an exemplary illustration of a 3D mesh model for a brain cortex of a control brain and a dyslexic brain and illustrates the delineation of a unit sphere corresponding to the 3D mesh model using spherical harmonics, as will be described in detail below. A model based on the analysis of previously classified brain cortices may be applied to determine whether the analyzed brain cortex is indicative of a developmental disorder or normal based on the number of spherical harmonics combined to delineate the unit sphere to the 3D mesh model (block 24). Generally, an autistic brain cortex uses more spherical harmonics to delineate a corresponding unit sphere to a 3D mesh model as compared to the number of spherical harmonics used to delineate a unit sphere to a 3D mesh model corresponding to a normal brain cortex. Furthermore, a dyslexic brain cortex generally uses less spherical harmonics to delineate a unit sphere to a 3D mesh model corresponding to the dyslexic brain cortex as compared to the number of spherical harmonics used to delineate a unit sphere to a 3D mesh model corresponding to a normal brain cortex. For example, referring to FIG. 2Q, the unit sphere corresponding to the control brain cortex is substantially delineated to the original 3D mesh model with approximately 25 SHs, while the unit sphere corresponding to the autistic brain cortex is substantially delineated to the original 3D mesh model with 60 SHs. Similarly, referring to FIG. 2R, the unit sphere corresponding to the normal brain cortex is substantially delineated to the original 3D mesh model with approximately 25 SHs, while the unit sphere corresponding to the dyslexic brain cortex is substantially delineated to the original 3D mesh with less SHs.

Figure 3:
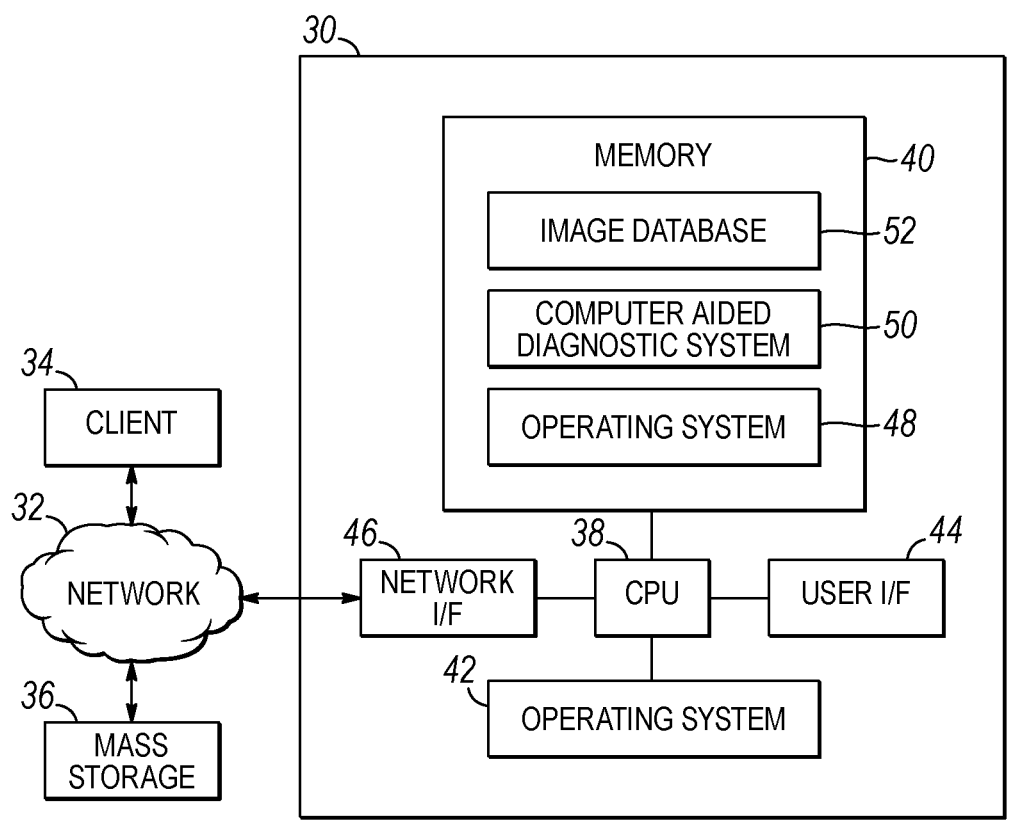
FIG. 3 is a block diagram of an exemplary apparatus suitable for implementing steps from the process of FIG. 1.

One or more steps in process 10 may be implemented in an automated fashion, utilizing a computer or other electronic device to implement such steps. FIG. 3, for example, illustrates an exemplary apparatus 30 within which various steps from process 10 may be implemented in a manner consistent with the invention. Apparatus 30 in the illustrated embodiment is implemented as a server or multi-user computer that is coupled via a network 32 to one or more client computers 34, as well as an imaging system 36, e.g., a helical or multi-slice LDCT scanner. For the purposes of the invention, each computer 30, 34 may represent practically any type of computer, computer system or other programmable electronic device. Moreover, each computer 30, 34 may be implemented using one or more networked computers, e.g., in a cluster or other distributed computing system. In the alternative, computer 30 may be implemented within a single computer or other programmable electronic device, e.g., a desktop computer, a laptop computer, a handheld computer, a cell phone, a set top box, etc.

Computer 30 typically includes a central processing unit 38 including at least one microprocessor coupled to a memory 40, which may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 40 may be considered to include memory storage physically located elsewhere in computer 30, e.g., any cache memory in a processor in CPU 38, as well as any storage capacity used as a virtual memory, e.g., as stored on a mass storage device 42 or on another computer coupled to computer 30. Computer 30 also typically receives a number of inputs and outputs for communicating information externally. For interface with a user or operator, computer 30 typically includes a user interface 44 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 30 may also include one or more mass storage devices 42, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface 46 with one or more networks 32 (e.g., a LAN, a WAN, a wireless network, and/or the Internet, among others) to permit the communication of information with other computers and electronic devices. It should be appreciated that computer 30 typically includes suitable analog and/or digital interfaces between CPU 36 and each of components 40, 42, 44 and 46 as is well known in the art. Other hardware environments are contemplated within the context of the invention.

Computer 30 operates under the control of an operating system 48 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 30 via network 32, e.g., in a distributed or client-server computing environment, whereby the processing required to implement the functions of a computer program may be allocated to multiple computers over a network.

As an example, computer 30 may include a computer aided diagnostic (CAD) system program 50 used to implement one or more of the steps described above in connection with process 10. For the purposes of implementing such steps, an image database 52, storing LDCT head scan images, may be implemented in computer 30. It will be appreciated, however, that some steps in process 10 may be performed manually and with or without the use of computer 30.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable storage media include but are not limited to physical, tangible storage media such as volatile and non-volatile memory devices, floppy and other removable disks, hard disk drives, magnetic tape, optical disks (e.g., CD-ROMs, DVDs, etc.), among others.

In addition, various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Brain Cortex Segmentation

Accurate brain cortex segmentation from two dimensional and three dimensional head scans is a challenging problem because the intensities of the brain cortex and surrounding tissues (e.g., blood vessels, etc.) and/or organs are not clearly distinguishable. Using a conventional 3D parametric deformable boundary, image data corresponding to the brain cortex may be segmented from surrounding tissues and/or organs. However, the evolution of a brain cortex is controlled with two probabilistic visual appearance models, namely, a learned brain cortex appearance prior and a current appearance model of the image to be segmented. Further details for the segmentation of a brain cortex are described in the aforementioned article "Dyslexia diagnostics by 3D texture analysis of cerebral white matter gyrification."

The learned brain cortex appearance prior model is a 3D Markov-Gibbs random field (MGRF) model of the brain cortex intensities with translation- and rotation-invariant pairwise voxel interaction, being learned analytically based on developing a new maximum likelihood estimator from training data as introduced in G. Gimel'farb, *Image Textures and Gibbs Random Fields*, Kluwer Academic, 1999. The current appearance is modeled by a mixed marginal distribution of the voxel intensities in both the brain cortex and surrounding tissues/organs. To extract the voxel-wise model of the current cortex appearance, the mixture is precisely approximated with a linear combination of discrete Gaussians (LCDG) (as introduced in A. El-Baz and G. Gimel'farb, "EM Based Approximation of Empirical Distributions with Linear Combinations of Discrete Gaussians," Proc. of IEEE International Conference on Image Processing (ICIP'07), San Antonio, Tex., USA, Sep. 16-19, 2007, vol. IV, pp. 373-376; A. Farag, A. El-Baz, and G. Gimel'farb, "Precise segmentation of multimodal images," IEEE Transactions on Image Processing, 2006, vol. 15, issue 4, pp. 952-968) and automatically separated into the brain cortex and background LCDG models. FIGS. 2A-2L illustrate segmentation of the brain cortex image data. The Gibbs energies for each of the brain cortex voxel are higher than for any other brain tissues, making the proposed approach very accurate. Let (x,y,z) be Cartesian 3D point coordinates. A conventional parametric deformable surface, B (P$_1$, ... P$_k$), specified by K control vertices P$_k$=(x$_k$, y$_k$, z$_k$), evolves in the directions that minimize its energy, E, depending on internal, $\xi_{int}$(B), and external, $\xi_{ext}$(B), forces (as introduced in M. Kass, A. Witkin, D. Terzopoulos, "Snakes: Active contour models," Int. J. Computer Vision 1, 321-331 (1987)):

$$E = E_{int} + E_{ext} = \int_B (\zeta_{int}(B) + \zeta_{ext}(B)) dB \quad (1)$$

Consistent with the invention, a type of external energy that depends on both the learned prior and the current (on-going) appearance model is utilized. Accordingly, Q={0, ..., Q-1} and L={nl; bg} where Q and L are finite sets of image intensities (gray values) and region labels, respectively. To reduce the impact of global contrast and offset deviations of intensities due to different sensors, each input 3D image is normalized by mapping its signal range [qmin; qmax] to the maximal range of [0, 255]. Furthermore, a finite 3D arithmetic lattice R=[(x, y, z): x=0, ..., X-1; y=0, ..., Y-1; z=1, ..., Z-1] support a 3D image g:R→Q and its region map m:R→L. The label, m$_{x,y,z}$, associates the voxel, g$_{x,y,z}$, with the brain cortex or the background.

To consider the normalized images as samples of a prior MGRF model but exclude any image alignment before the segmentation, a generic translation and rotation-invariant MGRF with only voxel-wise and central symmetric pair-wise voxel interaction may be used. The central-symmetric voxel interaction is defined by a set of N characteristic central symmetric voxel neighborhoods {n$_v$=(v$\in$N)} on R and a corresponding set V of Gibbs potentials, one per neighborhood. A central-symmetric neighborhood n$_v$ embraces all voxel pairs such that the coordinate offsets between any voxel (x, y, z) and its neighbor (x', y', z') belong to an indexed semi-open interval [d$_{v,min}$, d$_{v,max}$); v$\in$N ⊂ {1, 2, 3, ...} of the inter-voxel distances:

$$d_{v,min} \leq \sqrt{(x-x')^2 + (y-y')^2 + (z-z')^2} < d_{v,max}.$$

In order to learn the appearance prior model, a training set S={(g$_t$, m$_t$): t=1, ..., T} with known region maps is used. Furthermore, a portion of a region R, R$_t$={(x,y,z):(x,y,z)$\in$R$\wedge$m$_{t,x,y,z}$=nl} supports the brain cortex in the t-th training part (g$_t$, m$_t$); t=1 ..., T. C$_{v,t}$ is a family of voxel pairs in R$_t^2$ with the coordinate offset ($\xi,\eta,\tau$)$\in$n$_v$ for a particular neighborhood. An empirical marginal probability distribution of voxel intensity, F$_{vx,t}$, and of intensity co-occurrences F$_{v,t}$ in the training brain cortex from $$g_t: F_{vx,t} = \left[ f_{vx,t}(q) = \frac{|R_{t,q}|}{|R_t|} : q \in Q \right] \text{ and}$$

-continued $$F_{v,t} = \left[ f_{v,t}(q, q') = \frac{|C_{v,t;q,q'}|}{|C_{v,t}|} : (q, q') \in Q^2 \right]$$

where R$_{t,q}$={(x,y,z):(x,y,z)$\in$R$_t \wedge$g$_{x,y,z}$=q} is a subset of voxels supporting the intensity q and C$_{v,t;q,q'}$ is a subset of the voxel pairs c$_{\xi,\eta,\tau}$(x,y,z)=((x,y,z),(x+$\xi$,y+$\eta$,z+$\tau$))$\in$R$_t^2$ supporting the intensity co-occurrence (q,q') in the training brain cortex from g$_t$. A potential function of voxel intensities V$_{vx}$=[V$_{vx}$(q):q$\in$Q] describes voxel-wise interaction, and a potential function of intensity co-occurrences in the neighboring voxel pairs V$_v$= [V$_v$(q,q'):(q,q')$\in$Q$^2$] describes the pair-wise interaction in the neighborhood n$_v$. The MGRF model of the t-th training pair is specified by the joint Gibbs probability distribution on the sublattice R$_t$:

$$P_t = \frac{1}{Z_t} \exp\left( |R_t| \left( V_{vx}^T F_{vx,t} + \sum_{v \in N} \rho_{v,t} V_{v,t}^T F_{v,t} \right) \right) \quad (2)$$

where $\rho_{v,t} = \frac{|C_{v,t}|}{|R_t|}$ may be considered the average cardinality of n$_v$ with respect to R$_t$.

To identify the MGRF model in Eq. (2), the Gibbs potentials may be determined analytically:

$$V_{vx,nl} = \log f_{vx,nl}(q) - \frac{1}{Q} \sum_{\kappa \in Q} \log f_{vx,nl}(\kappa) \text{ for } q \in Q; \text{ and} \quad (3)$$

$$V_{vx,nl}(q, q') + \lambda \rho_v (f_{v,nl}(q, q') - f_{vx,nl}(q) f_{vx,nl}(q')) \quad (4)$$
for $(q, q') \in Q^2$ where the common factor $\lambda$ may also be computed analytically.

The current appearance of a brain cortex may be modeled using a linear combination of discrete Gaussians (LCDG), where the marginal distribution of voxel intensities within a boundary of the brain cortex model may be considered a dynamic mixture of two probability models: a first model that characterizes the brain cortex, and a second model that characterizes the brain cortex's background. The dynamic mixture is partitioned into two LCDG models using an EM-based approach introduced in the aforementioned "Em based approximation of empirical distributions with linear combinations of discrete guassians."

Based on the appearance models described above, the evolution of the brain cortex model boundary for the learned prior and on-going cortex appearance model evolves guided by the combined external energy term of Eq. (1), where p$_{vx,nl}$(q) may be the marginal probability of the intensity q in the estimated current LCDG model for the brain cortex. As such, both the learned prior and the on-going cortex appearance model are guided by:

$$\zeta_{ext}(P=(x,y,z)) = -p_{vx,nl}(g_{x,y,z}) \pi_p(g_{x,y,z}|S) \quad (5)$$

In such embodiments, $\pi_p$(q|S) may be considered the prior conditional probability of q, given the fixed current intensities in the characteristic central-symmetric neighborhood of P for the MGRF prior model of Eq. (2), and Ep(q|S) may be considered the conditional Gibbs energy of pair-wise interaction for the voxel P when an intensity q is assigned to the brain cortex while the other current intensities in all its neighboring voxels over the characteristic neighborhoods n$_v$ remains fixed. After the changes in the total energy $E_B$ of the 3D region $R_B \subset R$ inside the evolving boundary B stop, the evolution terminates, where $E_B$ may be defined by:

$$E_B = \sum_{\forall P=(x,y,z) \in R_B} E_P(g_{x,y,z} | S) \tag{6}$$

Spherical Harmonic Shape Analysis

In embodiments of the invention, a 3D mesh model may be generated for the surface of a segmented brain cortex. The 3D model of the brain cortex in part describes gyrification of the brain cortex, and in particular gyrification of the cerebral white matter (CWM) in the brain cortex. Shape analysis of the 3D model therefore classifies a brain cortex based at least in part on an analysis of CWM structural differences.

In some embodiments, the surface of the segmented brain cortex may be approximated by a triangulated mesh (see, e.g., FIG. 2N) including a plurality of interconnected nodes (e.g., elements 28 of FIG. 2N). The triangulated 3D mesh may be generated using techniques introduced in Fang, D. Boas, "Tetrahedral mesh generation from volumetric binary and grayscale images," Proceedings of IEEE International Symposium on Biomedical Imaging from Nano to Macro, Boston, Mass., USA, Jun. 28-Jul. 1, 2009, pp. 1142-1145.

Figure 4:
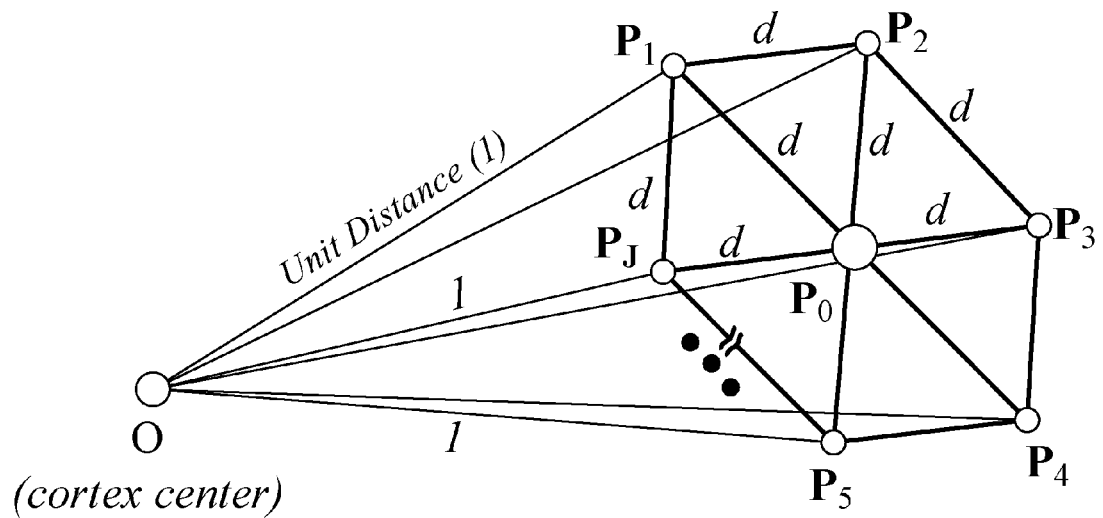
FIG. 4 is an illustration of a plurality of mesh nodes and spacing between such mesh nodes to map a model of a brain cortex to a unit sphere by the process of FIG. 1.
Figure 5:
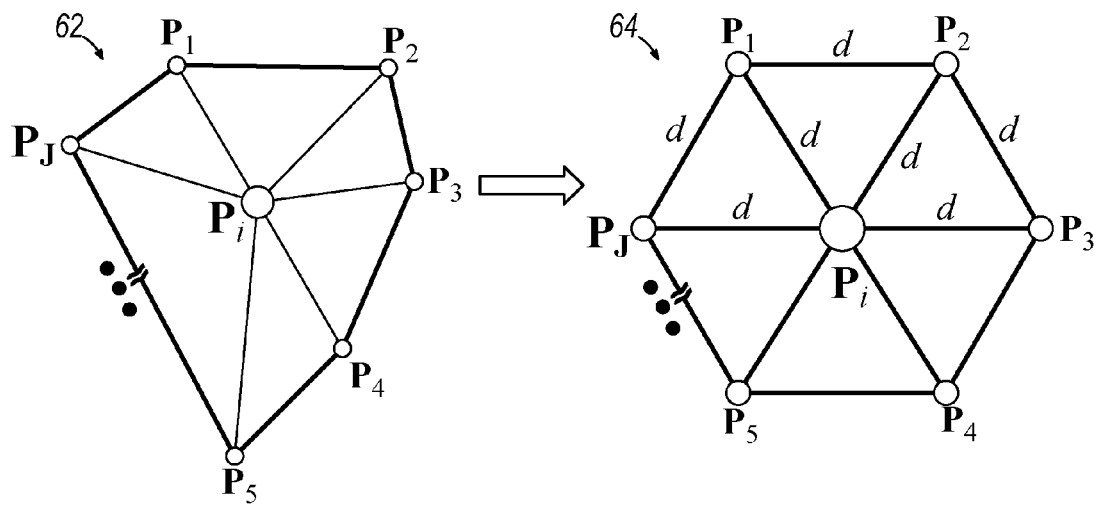
FIG. 5 is an illustration of a plurality of mesh nodes and rearrangement of such nodes that may be performed by the process of FIG. 1.

The surface of the 3D mesh model may be mapped to a corresponding unit sphere (see, e.g., FIGS. 2N-P). In some embodiments of the invention, a 3D mesh model of the brain cortex may be mapped to the unit sphere by modifying the position of the plurality of nodes of the mesh model such that (1) each node is a determined unit distance from the brain cortex center and (2) each node is an equal distance from each neighboring node. FIG. 4 provides an exemplary illustration of nodes $P_{0-J}$ of a 3D mesh model being positioned such that each node $P_{0-J}$ is a unit distance T from the center O of the model of the cortex and such that each node $P_{0-J}$ is an equal distance 'd' from each neighboring node. FIG. 5 provides an exemplary illustration of the rearrangement of the nodes $P_{i-J}$ from an original mesh configuration 62 to a mesh mapped to a unit sphere 64.

Embodiments of the invention may execute an Attraction-Repulsion algorithm to map a 3D mesh of a brain cortex to a unit sphere, where the Attraction-Repulsion algorithm includes an iteration index $\tau$, the total number of mesh nodes may be considered T, and $P_{\tau,I}$ may be considered the Cartesian coordinates of the surface node i at iteration $\tau$; i=1, . . . I. J may be considered the number of neighbors for a mesh node (see, e.g., FIG. 5), where $d_{\tau,ij}$ defines the Euclidean distance between the mesh nodes i and j at iteration $\tau$, where i=1, . . . , I and j=1, . . . , J. Furthermore, $\Delta_{\tau,ji} = P_{\tau,j} - P_{\tau,i}$ may be considered the displacement between the nodes j and I at iteration $\tau$. Retraction constants, $C_{A,1}$ and $C_{A,2}$, and a repulsion constant $C_R$ control the displacement of each surface node. The Attraction-Repulsion algorithm iteratively rearranges the nodes of a mesh model to a unit sphere while maintaining the two distances discussed above. First, an attraction step centers each node $P_i$; i=1 . . . , I, with respect to neighboring nodes by iteratively adjusting each node's location, by:

$$P'_{\tau,i} = P_{\tau,i} + C_{A,1} \sum_{j=1; j \neq i}^{J} \Delta_{\tau,ji} d_{\tau,ji}^2 + C_{A,2} \frac{\Delta_{\tau,ji}}{d_{\tau,ji}} \tag{7}$$

The factor $C_{A,2}$ may prevent tightly packed nodes from collision and pushes adjusted nodes away from neighboring nodes if a particular neighboring node is significantly closer than other neighboring nodes.

A repulsion step serves to inflate the mesh by pushing all nodes outward to become evenly spaced after a final back-projection onto the unit sphere along rays from the center of the sphere. To prevent shifting and collisions with altered nodes, the location of each node $P_i$ is updated before the back-projection by utilizing the following equation:

$$P'_{\tau+1,i} = P'_{\tau,i} + \frac{C_R}{2I} \sum_{j=1; j \neq i}^{I} \left( \frac{\Delta_{\tau,ji}}{|\Delta_{\tau,ji}|^2} \right) \tag{8}$$

A repulsion constant $C_R$ controls the displacement of each node and also balances between processing time and accuracy ((e.g. a smaller $C_R$ values guarantees that the nodes will not become crossed during the iterations at the expense of the increased processing time). For example, in some embodiments, the repulsion constant may be configured between approximately 0.3 and 0.7, although other values may be used depending on accuracy and processing time.

Figure 6:
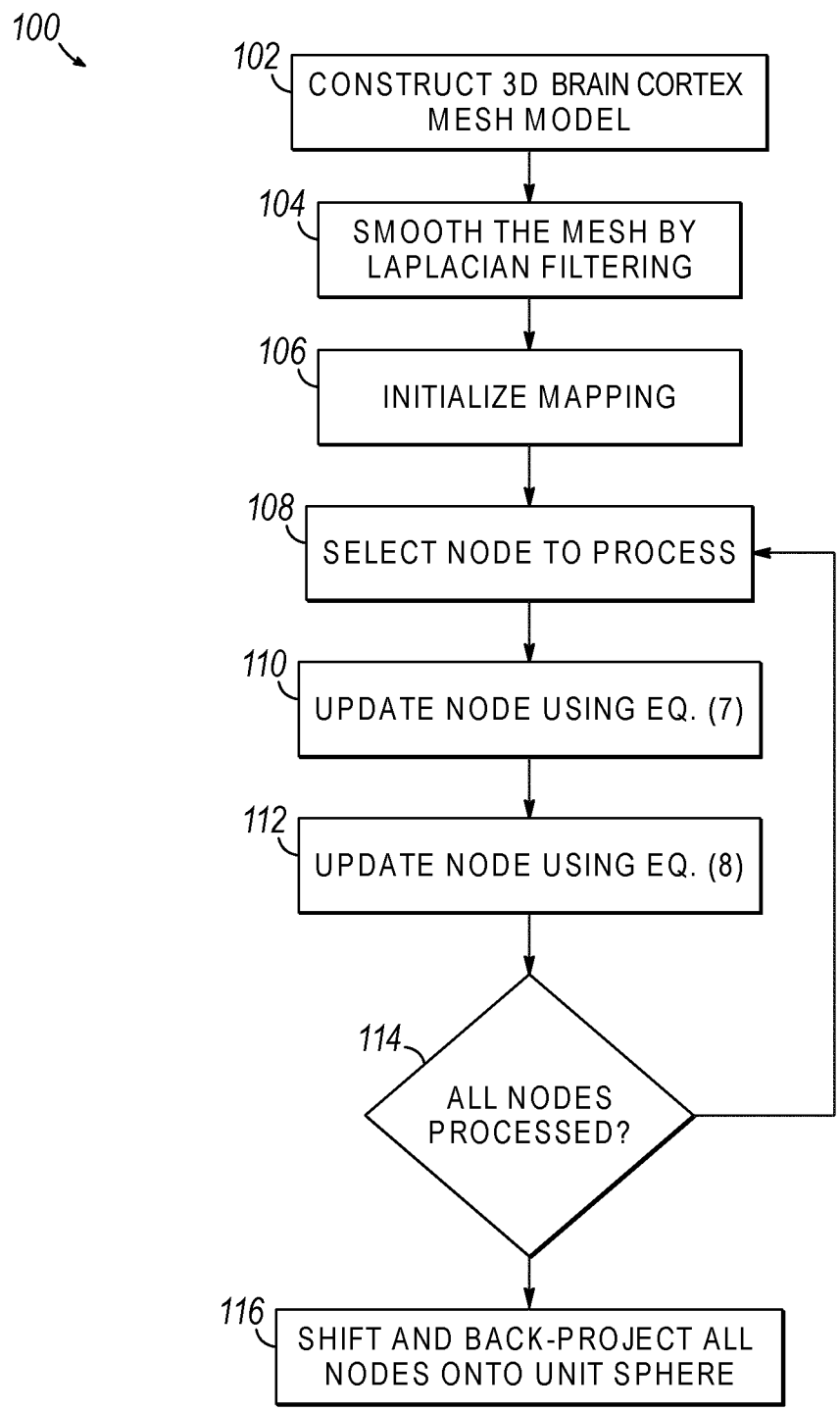
FIG. 6 is a flowchart of a sequence of operations that may be performed to map the 3D mesh model of FIG. 2N to the unit sphere of FIG. 2P.

Embodiments of the invention may generally perform the following steps for the Attraction-Repulsion Algorithm illustrated in the flowchart 100 of FIG. 6. The 3D mesh model may be constructed (block 102) (see, e.g., FIGS. 2M, 2N) and filtered using Laplacian filtering (block 104) (see, e.g., FIG. 2O). The filtered mesh may be mapped to a corresponding unit sphere by initializing the mapping (block 106) and processing each node of the mesh as shown in blocks 108-114, and the nodes may be shifted and back-projected onto the corresponding unit sphere (block 116) (see e.g., FIG. 2P) following the processing in blocks 108-114.

In particular, in block 108, a node is selected to be processed, and in block 110 the node is updated in the manner described above in connection with Eq. (7). In block 112 the node is updated in the manner described above in connection with Eq. (8), and block 114 passes control back to block 108 as long as additional nodes remain to be processed. Once all nodes have been processed, block 114 passes control to block 116 to shift and back-project the nodes onto the corresponding unit sphere.

The original brain cortex 3D model is approximated by the corresponding unit sphere and a linear combination of spherical harmonics (SHs), where the lower-order harmonics suffice to represent more generic details of the brain cortex, while the higher order SHs represent finer details, such that the number of SHs required to delineate a corresponding unit sphere to the original mesh model may be generally indicative of the gyrification of the brain cortex.

The SHs are generated by solving an isotropic heat equation for the brain cortex surface on the unit sphere, where $S: M \rightarrow U$ denotes the mapping of a brain cortex mesh M to the unit sphere U. Each node $P=(x,y,z) \in M$ mapped to the spherical position $u=S(P)$ may be represented by a spherical coordinate $u=(\sin \theta \cos \phi, \sin \theta \sin \phi, \cos \theta)$ where $\theta \in [0, \pi]$ and $\phi \in [0, 2\pi)$ are the polar and azimuth angles, respectively. A SH of $Y_{\alpha,\beta}$ of degree $\alpha$ and order $\beta$ may be defined as introduced in R. Courant, D. Hilbert, *Methods of Mathematical Physics*, vol. II. Interscience, New York (1953):

$$Y_{\alpha\beta} = \begin{cases} c_{\alpha\beta} G_\alpha^{|\beta|} \cos\theta \sin(|\beta|\varphi) & -\alpha \leq \beta \leq -1 \\ \frac{c_{\alpha\beta}}{\sqrt{2}} G_\alpha^{|\beta|} \cos\theta & \beta = 0 \\ c_{\alpha\beta} G_\alpha^{|\beta|} \cos\theta \cos(|\beta|\varphi) & 1 \leq \beta \leq \alpha \end{cases} \quad (9)$$

The associated Legendre polynomial is $$[c_{\alpha\beta} = \left(\frac{2_\alpha + 1}{2\pi} \frac{(a - |\beta|)!}{(a + |\beta|)!}\right)^{\frac{1}{2}}$$

and $G_\alpha^{|\beta|}$ of degree $\alpha$ and order $\beta$. For the fixed $\alpha$, the polynomials $G_\alpha^\beta$ are orthogonal over the range $[-1, 1]$.

The brain cortex may be reconstructed from the SHs determined in Eq. (9). An iterative technique introduced in L. Shen, M. K. Chung, "Large-scale modeling of parametric surfaces using spherical harmonics," Proc. 3rd International Symposium 3D Data Processing, Chapel Hill, N.C., Jun. 14-16, 2006, pp. 294-301, may be utilized in the reconstruction of the brain cortex. As shown in FIG. 2Q, the model accuracy does not significantly change for a control brain cortex from 55 to 60 SHs, while the model accuracy continues to increase for the autistic brain cortex from 15 to 60 SHs. Similarly, as illustrated in FIG. 2R, the model is generally accurate at about 25 SHs for the normal brain cortex, while the model is generally accurate between 10-10 SHs for a dyslexic brain cortex.

Therefore, embodiments of the invention may classify a brain cortex based at least in part on the shape of the brain cortex, where the shape may be described in terms of the number of SHs needed to delineate a corresponding unit sphere to the original mesh model. Therefore, the number of the SHs after which there are no significant changes in the approximations can be used as a new shape index quantifying the shape complexity of the brain cortex. Due to the unit sphere mapping, the original mesh for a brain cortex is inherently aligned with the mesh for the approximate shape, and the sum of the Euclidean distances between the corresponding nodes gives the total error between both the mesh models.

Figure 7:
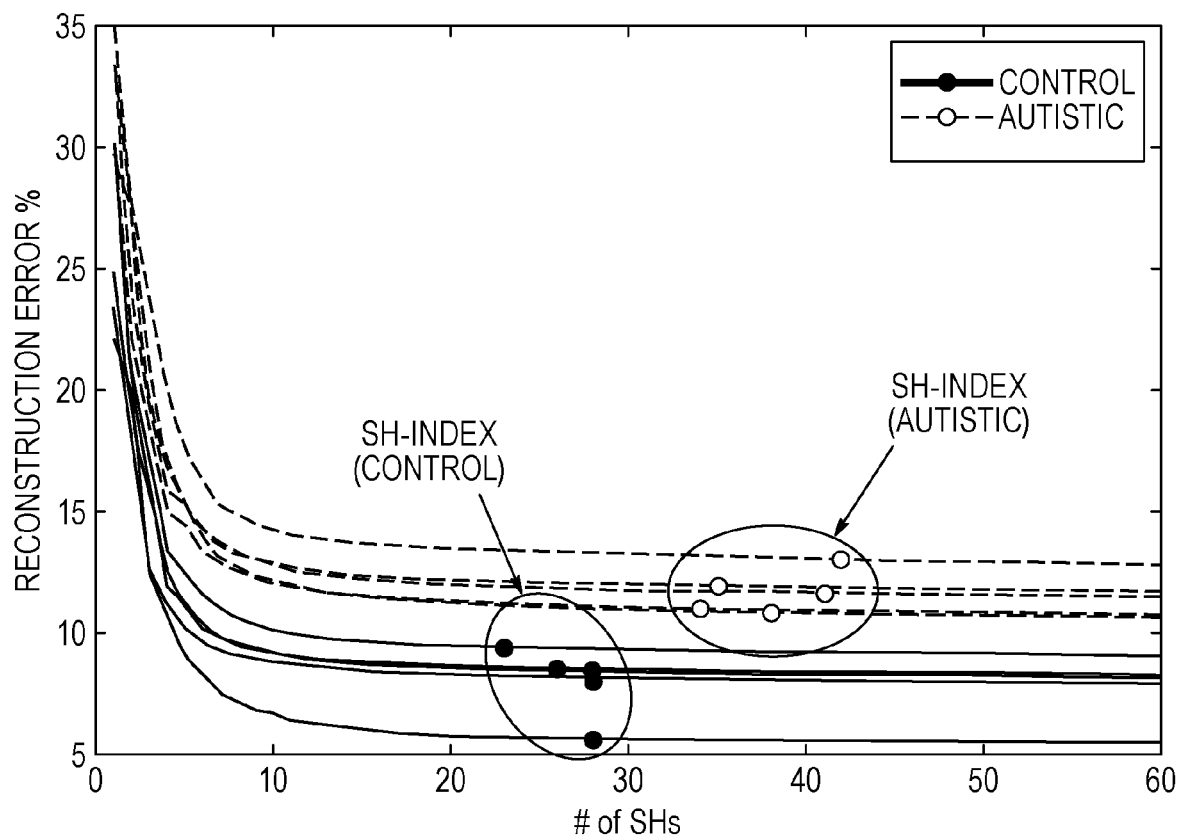
FIGS. 7-9 are graphs illustrating steps in the calculation the number of spherical harmonics used to delineate the unit sphere of FIG. 2P to the 3D mesh model of FIG. 2N and the reconstruction error associated with such delineation.
Figure 8:
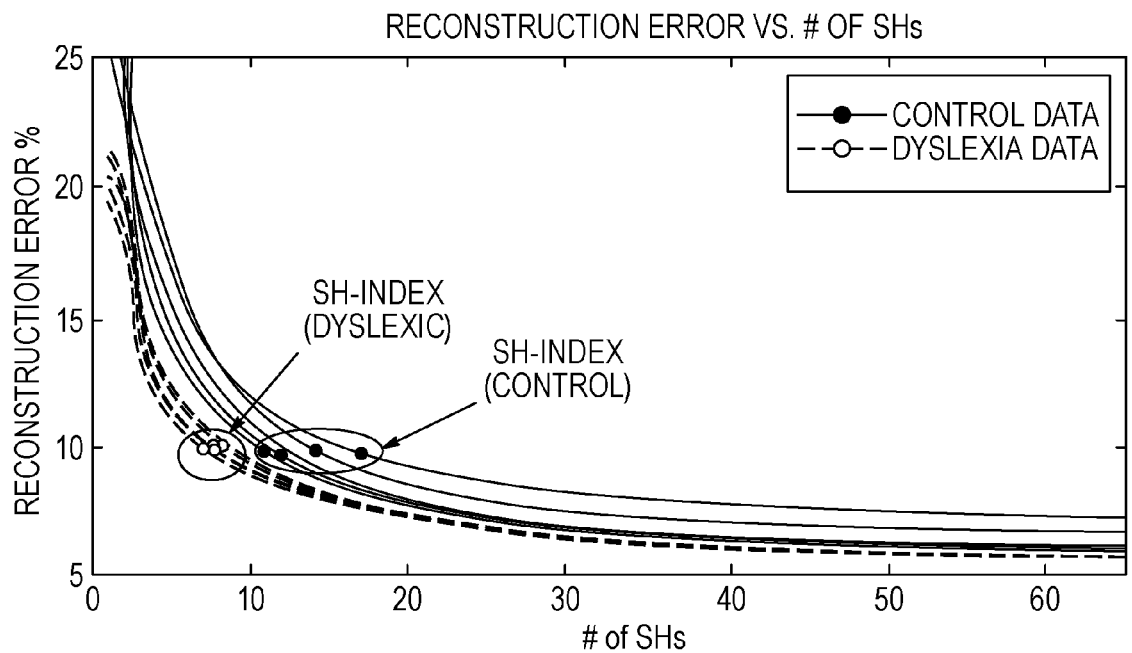
Figure 9:
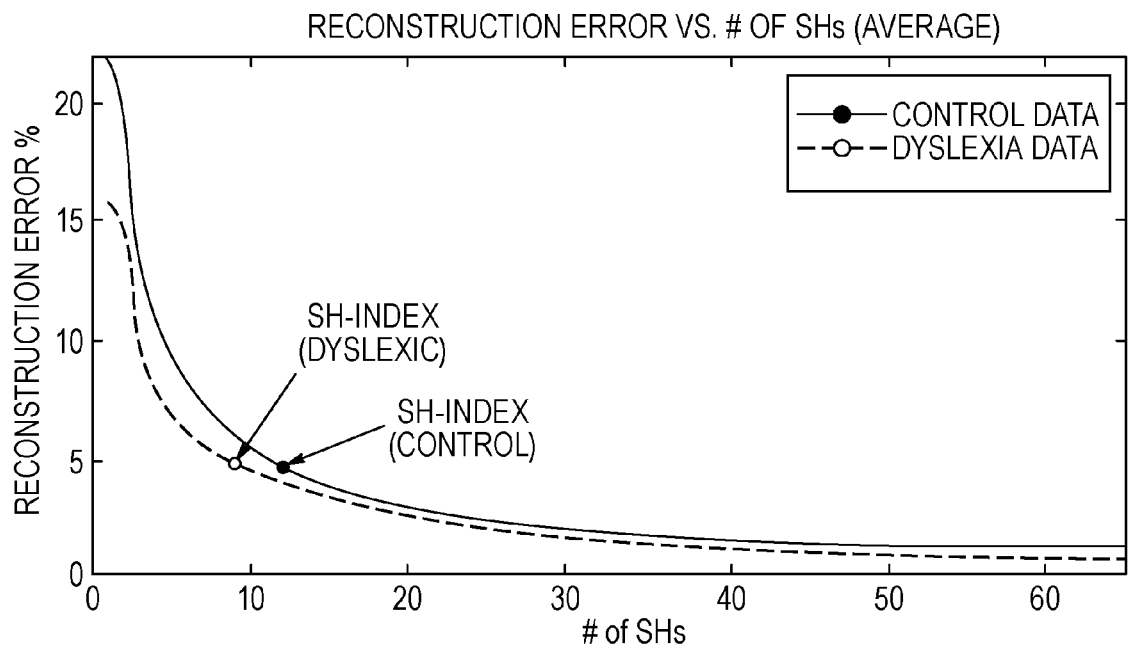

As shown in FIG. 7, the total error curves for the increasing number K of the SHs can be statistically analyzed to differentiate between the autistic and normal brain cortices. Similarly, in FIG. 8, the total error curves for the increasing number K of the SHs can be statistically analyzed to differentiate between the dyslexic and normal brain cortices. FIG. 9 is an exemplary chart illustrating an average error curve for a dyslexic and control brain for the number of SHs.

Working Example

With reference to autism, the proposed approach has been tested on in-vivo data that has been collected from 45 subjects (15 autistic subjects of age 22.1+/−9.7 years and 30 control subjects of age 20.7+/−8.5 years). The subjects were scanned using a 1.5 Tesla GE MRI system with voxel resolution of 0.9375×0.9375×1.5 mm$^3$ using a T2 weighted imaging sequence protocol. The "ground truth" diagnosis to evaluate the classification accuracy for each patient was given by five medical experts. The training subset for classification (10 persons in FIG. 7) was arbitrarily selected among all the 45 subjects. The classification accuracy of the k-nearest classifier for both the training and test subjects was evaluated using the $x^2$-test at the 95% confidence level: this correctly classified 14 out of 15 autistic subjects (93.3% accuracy), and 30 out of 30 control subjects (100% accuracy). The accuracy of the traditional volumetric approach is 8 out of 15 autistic subjects (53.3%), and 19 out of 30 control subjects (63.3%) at the 95% confidence level. These results highlight the advantage of the present invention. In total, these preliminary results show that the 3D brain cortex shape analysis is able to accurately discriminate between autistic and normal subjects. Embodiments of the invention derive the efficient quantitative classification feature from the whole 3D cortex shape.

With reference to dyslexia, the present invention has been tested on in-vivo data that had been collected from 30 subjects (16 dyslexic subjects of age 18+/−40 years and 14 control subjects of age 18+/−40 years). The subjects were scanned using a 1.5 Tesla GE MRI system with voxel resolution of 0.9375×0.9375×1.5 mm$^3$ using a T2 weighted imaging sequence protocol. The "ground truth" diagnosis to evaluate the classification accuracy for each patient was given by five medical experts. The training subset for classification was arbitrarily selected among all the 30 subjects. The classification accuracy of the k-nearest classifier for both the training and test subjects was evaluated using the $x^2$-test at the three confidence levels, 85, 90, and 95%, in order to examine significant differences in the estimated SH index. As expected, the 85% and 90% confidence levels yielded the best results and correctly classified 16 out of 16 dyslexic subjects (a 100% accuracy) and 14 out of 14 control subjects (a 100% accuracy). The 95% confidence level obviously gives smaller accuracy rates for both the groups, accurately identifying 15 out of 16 dyslexic subjects (93.7%) and 12 out of 14 control subjects (85.7%). The accuracy of the traditional volumetric approach is 7 out of 16 dyslexic subjects (43.75%), and 9 out of 14 control subjects (64.29%) at the 85% confidence level. At a 95% confidence level our approach is more accurate than the traditional approach using an 85% confidence level. These results highlight the advantage of the present invention as opposed to conventional methods. Embodiments of the invention derive an efficient quantitative classification feature from the entire 3D cortex shape.

Attention-Deficit/Hyperactivity Disorder (ADHD)

Attention-Deficit/Hyperactivity Disorder (ADHD) is a neurodevelopment disorder of childhood characterized by difficulties of inattention or hyperactivity and impulsiveness or a combination thereof. Similar to dyslexia, studies have reported the brains of patients with ADHD as having smaller volumes than a normal brain. Thus, similar to dyslexia it is believed that there may be notable shape differences between a normal brain cortex and an ADHD brain cortex, and that ADHD brains may exhibit a unique range of spherical harmonics that uses less spherical harmonics to delineate a unit sphere to a 3D mesh model than a normal brain. As such, it is believed that spatial analysis, and in particular the computed number of spherical harmonics to delineate a unit sphere to a 3D mesh model, may be used to classify a brain for the purposes of detecting ADHD (with the expectation being that an ADHD brain will typically require less spherical harmonics than a normal brain).

In addition, it is believed that ADHD, dyslexia and autism, as well as a normal brain, may be associated with particular ranges of spherical harmonics such that the classification techniques herein may be used to classify a brain into one of any or all of the aforementioned classifications (ADHD, dyslexia, autism, normal). However, it will also be appreciated that some embodiments of the invention may be used to classify for any single developmental disorder (e.g., ADHD, dyslexia or autism), so the invention does not require classifying between multiple different classifications.

Conclusion

Embodiments of the invention therefore rely on using the shape of a segmented 3D brain cortex as a reliable diagnostic feature in identifying developmental brain disorders, including for example ADHD, dyslexia and autism. While the present invention has been described with respect to ADHD, autism and dyslexia, the invention is not so limited. Embodiments of the invention may classify other types of brain disorders based on shape analysis. Embodiments of the invention may also be used to solely classify for ADHD, for dyslexia, or for autism. In some embodiments, the shape analysis of the present invention may provide significant benefits over conventional methods, including for example, improved classification speed and accuracy. Furthermore, it is believed that the herein-described brain shape analysis may lead in some instances to more accurate and clinically useful fast classification of a brain without the need for prolonged professional observation and testing.

Other modifications will be apparent to one of ordinary skill in the art. Therefore, the invention lies in the claims hereinafter appended.

What is claimed is:

1. A method for classifying a brain, the method comprising:
   processing image data including a brain cortex to generate segmented image data for the brain cortex;
   generating a three dimensional (3D) model of the brain cortex based on the segmented image data;
   using at least one processor, performing spherical harmonic shape analysis of the 3D model, including computing a number of spherical harmonics required to delineate a unit sphere to the 3D model; and
   classifying the brain cortex based on the number of spherical harmonics required to delineate the unit sphere to the 3D model.

2. The method of claim 1, wherein classifying the brain cortex includes classifying the brain cortex as being indicative of autism based on the shape analysis of the 3D model.

3. The method of claim 1, wherein classifying the brain cortex includes classifying the brain cortex as being indicative of dyslexia based on the shape analysis of the 3D model.

4. The method of claim 1, wherein classifying the brain cortex includes classifying the brain cortex as being indicative of Attention-Deficit/Hyperactivity Disorder (ADHD) based on the shape analysis of the 3D model.

5. The method of claim 1, wherein the image data comprises a head scan.

6. The method of claim 5, wherein processing the image data includes segmenting image data associated with the brain cortex from image data associated with the head scan.

7. The method of claim 1, wherein the 3D model of the brain cortex describes gyrification of the brain cortex, and wherein the computed number of spherical harmonics is indicative of the gyrification of the brain cortex.

8. The method of claim 1, wherein performing spherical harmonic shape analysis includes mapping the 3D model to the unit sphere prior to computing the number of spherical harmonics.

9. The method of claim 8, wherein mapping the 3D model to the unit sphere includes modifying positions of a plurality of nodes in the 3D model such that each node is a substantially determined unit distance from a center of the brain cortex and each node is a substantially equal distance from each neighboring node.

10. The method of claim 9, wherein mapping the 3D model to the unit sphere includes performing an interactive attraction-repulsion algorithm including an attraction step that centers each node with respect to neighboring nodes and a repulsion step that pushes all nodes outward to become evenly spaced after a back-projection onto the unit sphere.

11. The method of claim 1, wherein classifying the brain cortex uses a learned shape model.

12. The method of claim 1, wherein the 3D model comprises a 3D mesh model of a surface of the brain cortex.

13. The method of claim 1, wherein computing the number of spherical harmonics includes approximating the 3D model by the unit sphere and a linear combination of spherical harmonics.

14. The method of claim 1, further comprising determining an error value between the delineated unit sphere and the 3D model for each spherical harmonic, wherein classifying the brain cortex is based at least in part on the determined error value for each spherical harmonic.

15. A method for classifying a brain, the method comprising:
   processing image data including a brain cortex to generate segmented image data for the brain cortex;
   generating a three dimensional (3D) model of the brain cortex based on the segmented image data;
   using at least one processor, performing spherical harmonic shape analysis of the 3D model, including mapping the 3D model to a unit sphere by modifying positions of a plurality of nodes in the 3D model such that each node is a substantially determined unit distance from a center of the brain cortex and each node is a substantially equal distance from each neighboring node;
   wherein the performing spherical harmonic shape analysis further includes computing a number of spherical harmonics required to delineate the unit sphere to the 3D model; and
   classifying the brain cortex based on the spherical harmonic shape analysis of the 3D model.

16. The method of claim 15, wherein mapping the 3D model to the unit sphere includes performing an iterative attraction-repulsion algorithm including an attraction step that centers each node with respect to neighboring nodes and a repulsion step that pushes all nodes outward to become evenly spaced after a back-projection onto the unit sphere.

17. A method for classifying a brain, the method comprising:
   processing image data including a brain cortex to generate segmented image data for the brain cortex;
   generating a three dimensional (3D) model of the brain cortex based on the segmented image data;
   using at least one processor, performing spherical harmonic shape analysis of the 3D model, including computing a number of spherical harmonics required to delineate a unit sphere to the 3D model;
   wherein computing the number of spherical harmonics includes approximating the 3D model by the unit sphere and a linear combination of spherical harmonics; and
   classifying the brain cortex based on the spherical harmonic shape analysis of the 3D model.

18. A method for classifying a brain, the method comprising:
   processing image data including a brain cortex to generate segmented image data for the brain cortex;

generating a three dimensional (3D) model of the brain cortex based on the segmented image data;

using at least one processor, performing spherical harmonic shape analysis of the 3D model, including computing a number of spherical harmonics required to delineate a unit sphere to the 3D model;

determining an error value between the delineated unit sphere and the 3D model for each spherical harmonic; and classifying the brain cortex based on the spherical harmonic shape analysis of the 3D model and based at least in part on the determined error value for each spherical harmonic.

19. An apparatus, comprising:

at least one processor; and program code configured upon execution by the at least one processor to classify a brain by:

processing image data including a brain cortex to generate segmented image data for the brain cortex;

generating a three dimensional (3D) model of the brain cortex based on the segmented image data;

performing spherical harmonic shape analysis of the 3D model, including computing a number of spherical harmonics required to delineate a unit sphere to the 3D model; and classifying the brain cortex based upon the number of spherical harmonics required to delineate the unit sphere to the 3D model.

20. A program product, comprising:

a non-transitory computer readable medium; and program code stored on the non-transitory computer readable medium and configured upon execution by at least one processor to classify a brain by:

processing image data including a brain cortex to generate segmented image data for the brain cortex;

generating a three dimensional (3D) model of the brain cortex based on the segmented image data;

performing spherical harmonic shape analysis of the 3D model, including computing a number of spherical harmonics required to delineate a unit sphere to the 3D model; and classifying the brain cortex based upon the number of spherical harmonics required to delineate the unit sphere to the 3D model.

\* \* \* \* \*